May 30, 1967     K. NITTKA     3,321,984

ADJUSTABLE TORQUE CONVERTER

Filed Aug. 26, 1964     5 Sheets-Sheet 1

Karl Nittka
INVENTOR.

BY Karl F. Ross

AGENT

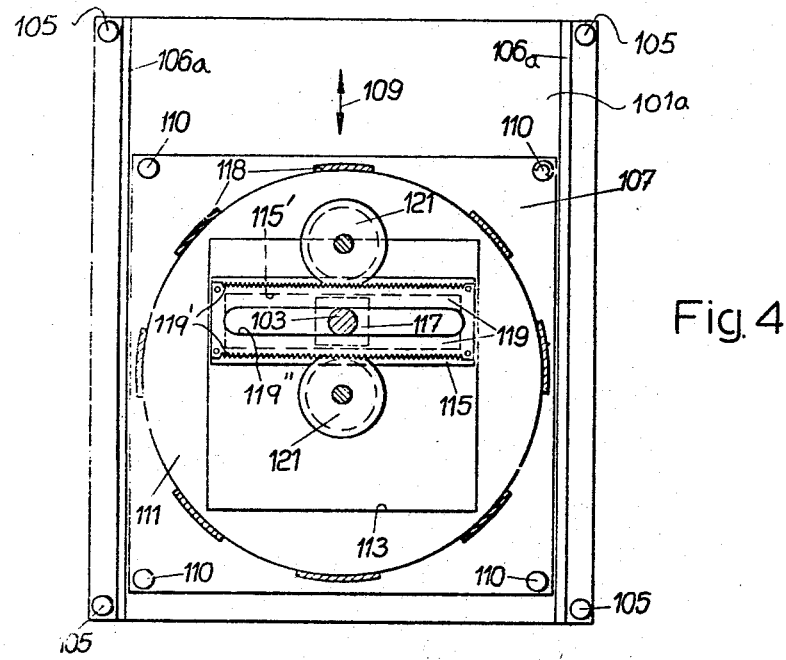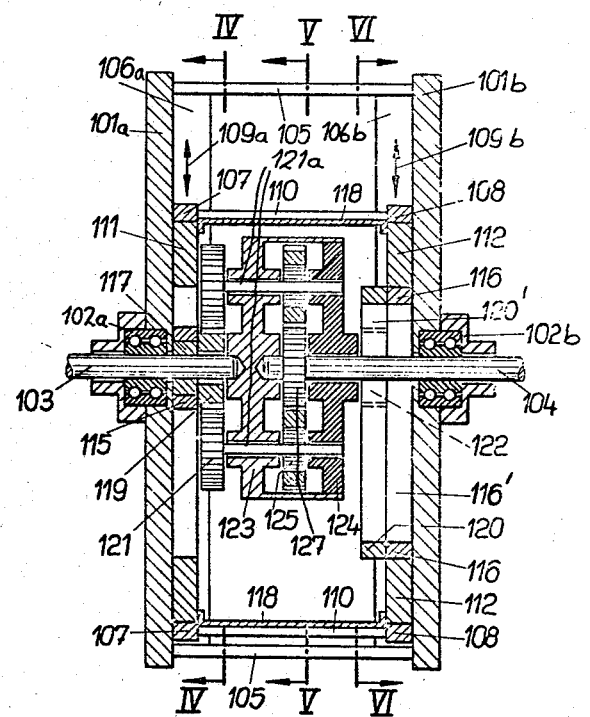

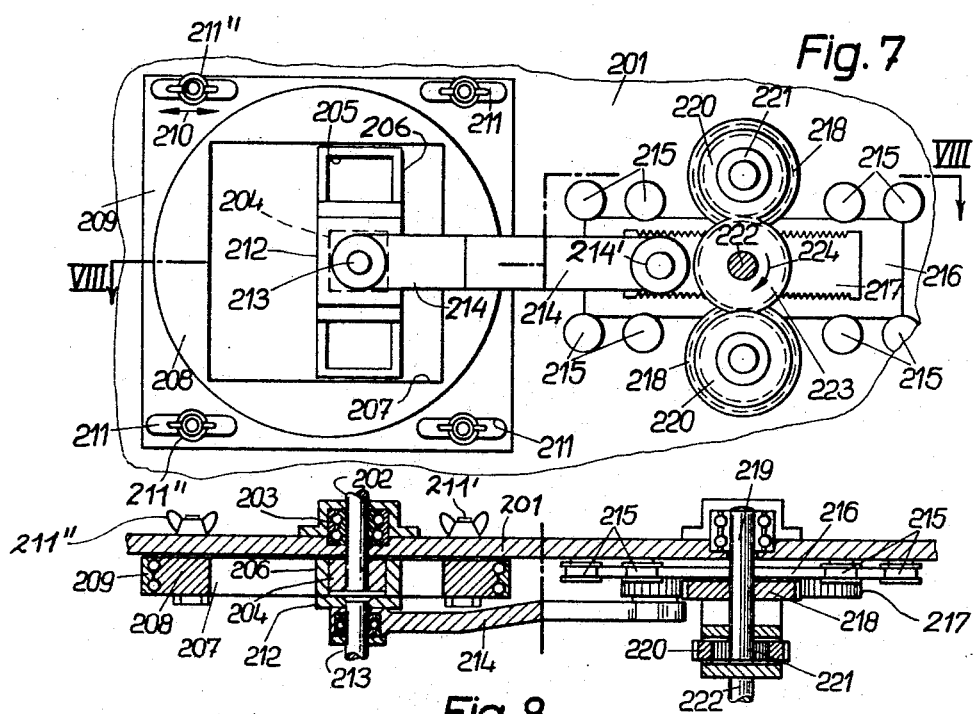
Fig. 7
Fig. 8
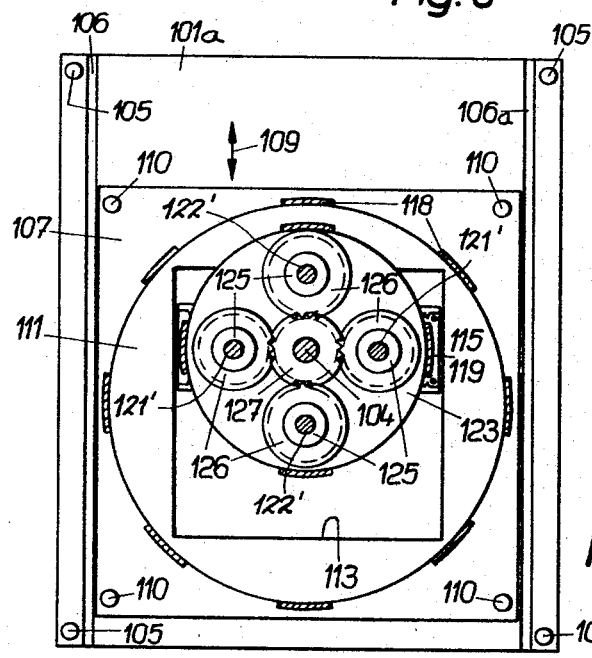
Fig. 5
Inventor:
Karl Nittka
Karl J. Ross
AGENT May 30, 1967     K. NITTKA     3,321,984

ADJUSTABLE TORQUE CONVERTER

Filed Aug. 26, 1964     5 Sheets-Sheet 4

Karl Nittka
INVENTOR.

BY Karl F. Ross

AGENT

May 30, 1967     K. NITTKA     3,321,984
ADJUSTABLE TORQUE CONVERTER
Filed Aug. 26, 1964     5 Sheets-Sheet 5

Karl Nittka
INVENTOR.

BY Karl F. Ross
AGENT

United States Patent Office 3,321,984
Patented May 30, 1967

3,321,984
ADJUSTABLE TORQUE CONVERTER
Karl Nittka, Uhlandstrasse 7, Wiesbaden, Germany
Filed Aug. 26, 1964, Ser. No. 392,137
Claims priority, application Germany, Sept. 25, 1963,
N 23,661
4 Claims. (Cl. 74—117)

My present invention relates to a transmission system adapted to be used as an adjustable torque converter in transmitting a variable torque from a drive shaft to a driven shaft.

The general object of my invention is to provide means for enabling a stepless variation in the speed ratio of the two shafts and, therefore, of the torque transmission therebetween or, in the case of a partial revolution, of affording similar variation in leverage.

A more particular object of my present invention is to provide a transmission system in which the adjustment referred to may be carried out while the system is in motion.

The foregoing objects are realized, in conformity with my present invention, by the provision of two interengaging members of which one is coupled with the drive shaft for joint rotation while the other eccentrically engages the first member to convert its rotation into a reciprocating motion; through the intermediary of a unidirectional coupling, such as an overrunning clutch or a pair of such clutches that are relatively inverted, the reciprocating motion or at least alternate strokes thereof are converted into unidirectional rotation of the driven shaft at a rate determined by the eccentricity of the second member. The provision of means for adjusting this eccentricity, pursuant to a more specific feature of my invention, enables variation of the rate of rotation of the driven shaft.

More particularly, one of the two members mentioned above may be a rotatable disk provided with a pair of parallel tracks, e.g., opposite edges of a rectangular cutout substantially centered on the disk; the second member will then be a slide engaging these tracks for reciprocation therealong, this slide being provided with a slot transverse to the direction of reciprocation and being therefore referred to hereinafter as a cross-slot slide. The slide has a stationary fulcrum, defined by a pivot engaging in its slot, which is offset from the center of the disk to bring about the relative eccentricity between the slide and the disk. It should be noted that this eccentricity is not constant but varies throughout a revolution of the disk about its center and concurrent revolution of the slide about its fulcrum, decreasing in fact to zero twice during such revolution, hence it is to be understood that the term "adjustment of eccentricity" when used in this context refers to its mean value (comparable to the root-mean-square value of electric sine waves).

In principle, either the disk or the slide may be directly coupled with a drive shaft to serve as the rotary prime mover, yet in many instances it will be more convenient to drive the slide and to journal the disk, as the entrained member, in such manner that its center may be shifted for adjustment of the eccentricity. In such case a suitable key, such as a square or rectangular block, may be inserted in the slot of the slide at the fulcrum thereof and mounted on the drive shaft for transmitting its rotation to the slide and disk.

Because of the intermittency of the rotation imparted to the driven shaft by a single unidirectional coupling, or even by a pair of such couplings effective during respective strokes, it is desirable to provide at least one additional set of coacting (e.g., disk and slide) members driven in unison with the first set but with a relative phase displacement so that the reciprocating motion provided by one set will bridge the periods of standstill in the dead-center positions of the reciprocating motion of the other set and vice versa. This results in a more uniform rate of rotation of the driven shaft, the degree of uniformity being further improved as more relatively staggered sets of coacting members and associated one-way clutches are added.

The above and other features of my invention will become more fully apparent from the following description of certain embodiments, reference being made to the accompanying drawing in which:

FIG. 3 is a sectional elevation of another transmission system according to the invention;

FIGS. 4, 5 and 6 are cross-sectional views respectively taken on the lines IV—IV, V—V and VI—VI of FIG. 3;

FIG. 7 is an elevational view similar to FIG. 2, showing a further embodiment;

FIG. 8 is a sectional view taken on the line VIII—VIII of FIG. 7;

Figure 1:
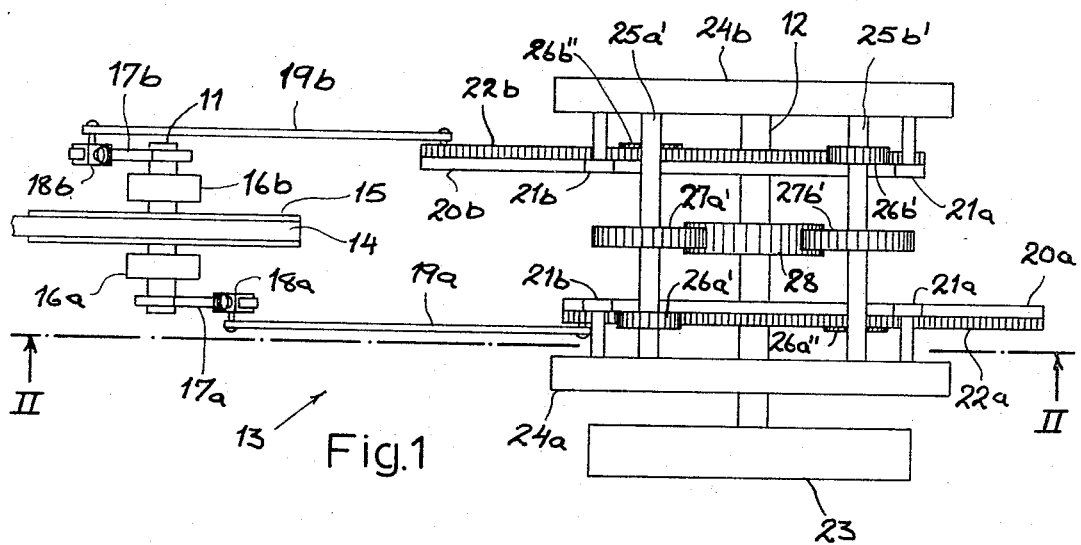
FIG. 1 is a plan view of a transmission system embodying features of my invention.
Figure 2:
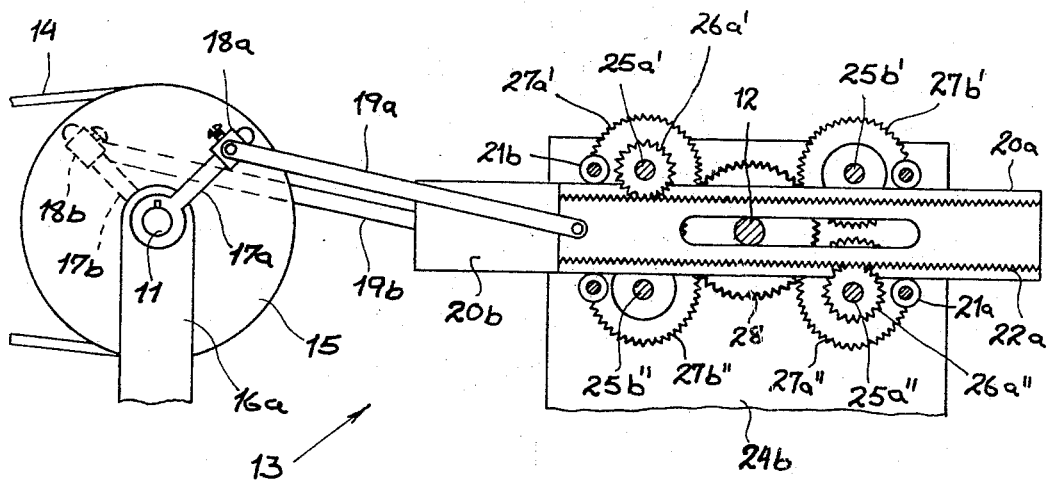
FIG. 2 is an elevational view taken on the line II—II of FIG. 1.

Reference will first be made to FIGS. 1 and 2 which show a drive or input shaft 11 and a driven or output shaft 12 interconnected by a transmission generally designated 13. Shaft 11 is maintained in continuous rotation by a conventional power source, not shown, through a belt 14 and a pulley 15 keyed to the shaft. The extremities of this shaft, projecting beyond its bearing supports 16a, 16b, carry a pair of crank arms 17a, 17b with cross-heads 18a, 18b of adjustable eccentricity having pitmans 19a, 19b connected thereto. Each pitman is articulated to a respective carriage 20a, 20b, slidably supported by rollers 21a, 21b, whose longitudinal edges form dual racks 22a and 22b, respectively.

Output shaft 12, shown to carry a flywheel 23 for continuity of motion, is journaled in bearing supports 24a, 24b which also support the rollers 21a, 21b along with four auxiliary shafts 25a', 25a", 25b', 25b". Keyed to the shafts 25a' and 25a" are a pair of gears 26a', 26a" in mesh with the upper and lower portions, respectively, of the rack 22a; similarly keyed to shafts 25b' 25b" are a pair of gears 26b', 26b" in mesh with the upper and lower poritons, respectively, of rack 20b. Also keyed to the shafts 25a', 25a", 25b', 25b" are the inner coupling elements of respective overrunning clutches 27a', 27a", 27b', 27b" whose outer coupling elements are peripherally toothed to mesh with a gear 28 keyed to shaft 12.

The crank arms 17a, 17b are relatively offset by about 90° so that correspondingly dephased reciprocating motions will be imparted by their pitmans 19a, 19b to their carriages 20a, 20b with racks 21a, 21b when the drive shaft 11 rotates. As the overrunning clutches 25a', 25a" and 25b', 25b" associated with a common rack are relatively inverted in regard to their effective direction, these clutches will become operative at successive phases in a cycle of rotation to drive the gear 28. Owing to the well-known characteristics of overrunning clutches, only the fastest-running one of the four gears 25a', 25a", 25b', 25b" (when turning in the proper direction) will thus impart its motion to the driven shaft 12 at any time; since this motion has a maximum speed when the corresponding rack goes through the midpoint of its forward stroke, the rate of displacement at that midpoint will determine the speed of the driven shaft.

In order to change the speed of shaft 12, it is merely necessary to adjust the eccentricity of cross-heads 18a, 18b by altering their positions on crank arms 17a, 17b.

I shall now describe with reference to succeeding figures a variety of transmission systems in which the crank drive of FIGS. 1 and 2 has been replaced by cross-slot slides adapted to have their eccentricity adjusted without the need for arresting the system, as is necessary with the arrangement just discussed.

In FIGS. 3–6 I have shown a transmission housing comprising a pair of end plates 101a, 101b which are provided with horizontally spaced vertical ribs 106a, 106b, respectively, accommodating two annular disk supports 107, 108 of rectangular outline for adjustable positioning as indicated by the arrows 109a and 109b. Bearings 102a, 102b on plates 101a, 101b respectively support an input or drive shaft 103 and an output or driven shaft 104. The plates 101a, 101b are rigidly interconnected by stays 105.

Each of the supports 107, 108, interconnected by rods 110, rotatably embraces a respective disk 111, 112 formed in turn with a substantially square cutout 113, 114 to receive a respective slide 115, 116 formed with a slot 115', 116'. Slot 115' is of rectangular shape and accommodates a square key 117 rigid with drive shaft 103. Slide 115 fixedly supports an extension 119, projecting beyond the face of disk 111, which is formed with two sets of rack teeth 119' in mesh with respective gears 121; rack member 119 is also slotted at 119" to clear the shaft 103 which passes through it into contact with a two-part cage 123, 124, rotatably suspended on shafts 103, 104 within the housing. Slide 116 similarly carries a rack member 120, having teeth 120', whose longitudinal slot 120" coincides with the slot 116' of the slide; the rack teeth of member 120 are in mesh with a pair of gears 122 whose axes lie in a plane disposed at right angles to the axial plane of gears 121. The shafts 121', 122' of gears 121, 122 are journaled in the cage 123, 124 and carry overrunning clutches 125 with toothed outer elements 126 which mesh with a gear 127 on output shaft 104. The disks 111, 112 are rigidly interconnected by bars 118 for joint rotation.

In operation, upon a fixing of the disk supports 107, 108 at a selected elevation by suitable means not shown, the disks 111, 112 and the cage 123, 124 (which may or may not be rigid with shaft 103) rotate at the same rate about their respective axes, the axis of the cage (and also of the slides 115, 116) being the common axis of shafts 103, 104, whereas the axis of the disk structure 111, 112, 118 passes through the center of the cutouts 113, 114. It will be understood that the contact surfaces between the disks and their supports, between the slides and their guiding edges, and between the key member 117 and the longitudinal edges of its slot 115' should be suitably lubricated or coated with a low-friction material to prevent binding.

If the two aforementioned axes of rotation were made to coincide, output shaft 104 would be entrained at the speed of input shaft 103. Generally, however, the two axes will be spaced apart by a selected distance so that the slides 115, 116 are constrained to reciprocate both longitudinally and transversely, within their respective cutouts, with reference to the cage axis and the associated gears 121, 122. This reciprocation is communicated by the gears 121, 122 through the overrunning clutches 125, 126 to the center gear 127, in the manner previously described with reference to FIGS. 1 and 2, so that the shaft 104 is also subjected to an acceleration due to the linear displacement of the slides; this acceleration, whose magnitude depends upon the selected eccentricity as well as the dimensions of the gear systems 121, 122, 126, 127, may result in a rate of rotation considerably greater than the speed of the input shaft 103 upon which it may be superimposed either additively or subtractively, depending upon the orientation of the overrunning clutches.

Since a full reciprocation of each slide with reference to the associated gears corresponds to a complete rotation of shaft 103, and since the two slides 115, 116 are shown disposed at right angles to each other, the torques intermittently applied by these slides to the central gear 127 are again in quadrature to smooth the rotation of output shaft 104. Additional smoothing means, such as the flywheel 23 of FIG. 1, may of course also be used in this and other embodiments.

In FIGS. 7 and 8 I have shown a system broadly similar to one half of the transmission shown in FIGS. 1 and 2 but with substitution of a cross-slot slide for the crank 17a or 17b thereof.

The system of FIGS. 7 and 8 comprises a mounting plate 201, which may be part of a housing, traversed by an input shaft 202 which is journaled in ball bearings 203. A key 204 fixedly secured to shaft 202 plays in a slot 205 of a slide 206 received in a square cutout 207 of a rotatable disk 208. An annular support 209 for disk 208 is shown provided with slots 211 traversed by bolts 211' which pass through the wall 201 and are secured to it by wing nuts 211" to fasten the disk 208 and its support 209 in a selected position of adjustment. A yoke 212, spanning the key 204, is articulated at 213 to a pitman 214 which in turn is hinged at 214' to a carriage 216 guided between rollers 215. A rack member 217 on carriage 216 has its teeth in mesh with two pinions 218 whose shafts 219 carry the inner coupling elements 221 of a pair of inversely oriented overrunning clutches, the outer elements of these clutches being again in meshing engagement with a central gear 224 on an output shaft 222. Rotation is imparted to shaft 222, as indicated by arrow 224, in the manner previously described, the rate of this rotation depending on the eccentricity of slide 206 as measured by the adjustable spacing between shaft 202 and the center of disk 208.

The operation of the system of FIGS. 7 and 8 may be best explained with reference to FIG. 12 whose views (a), (b) and (c) diagrammatically illustrate three different positions of the slide 206 and the cutout 207. Also shown in these views is the center O of the disk and its cutout, the fulcrum of slide 206 represented by shaft 202, and the midpoint of the slide constituted by the pivot 213. In the starting position (a) the points 202 and 213 coincide; in the next position (b), occuring after a rotation of 45°, midpoint 213 has moved toward center O along a circle C whose diameter equals the fixed but adjustable distance between points O and 202. In the third position (c), established after a rotation of 90°, point 213 coincides with center O. Thus, the pivot 213 (on which the pitman 214 in FIGS. 7 and 8 is articulated) swings around a circle of variable radius, i.e. circle C, twice per revolution of the disk; since the position of center O is readily adjustable while the system is in motion, the radius of this circle may be easily varied during operation.

Figure 12:
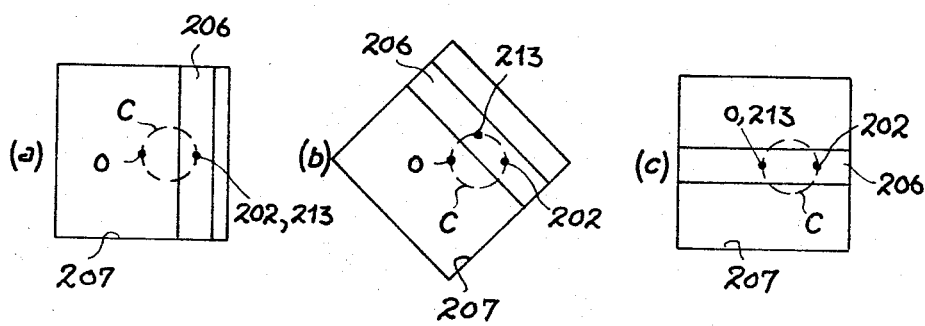
FIG. 12 is a diagram serving to explain the mode of operation of the systems of FIGS. 7–11.
Figure 6:
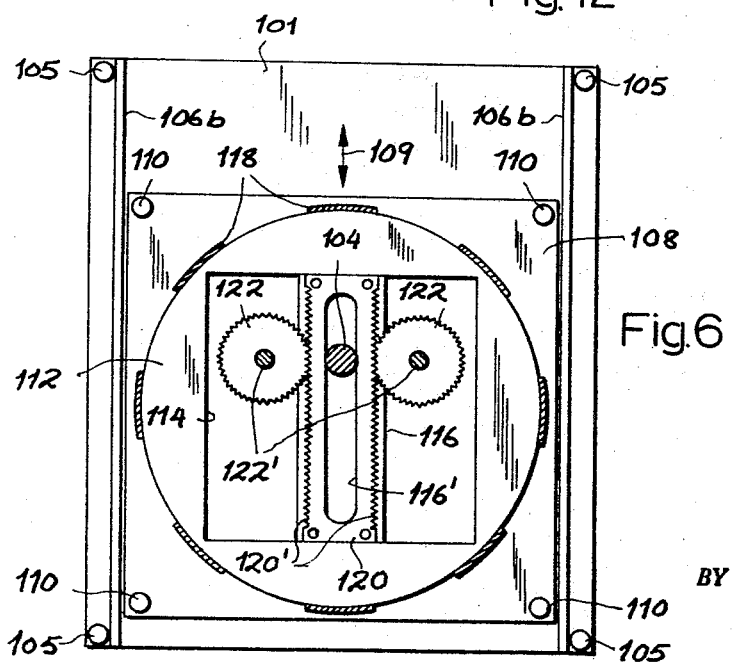

It will also be understood from FIG. 12 that a combination of two disks and slides in lieu of the single unit shown in FIGS. 7 and 8, in analogy with the arrangement of FIGS. 1 and 2, will produce reciprocating motions with a 90° phase difference if the two cutouts are relatively offset by 45°, this offsetting corresponding to a 90° advance of midpoint 213 along circle C.

Figure 11:
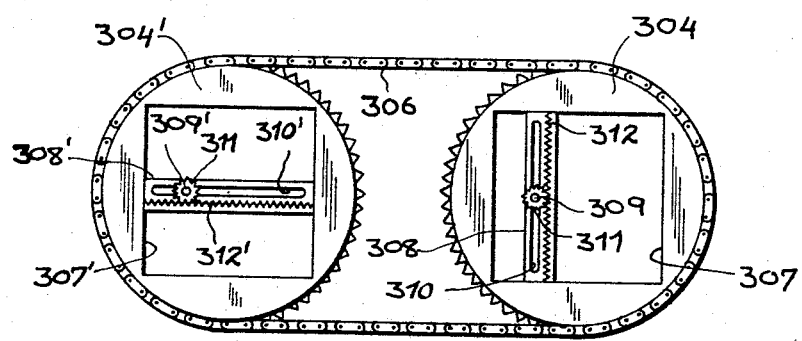
FIGS. 10 and 11 are an elevational view and a section taken respectively along the lines X—X and XI—XI of FIG. 9.
Figure 9:
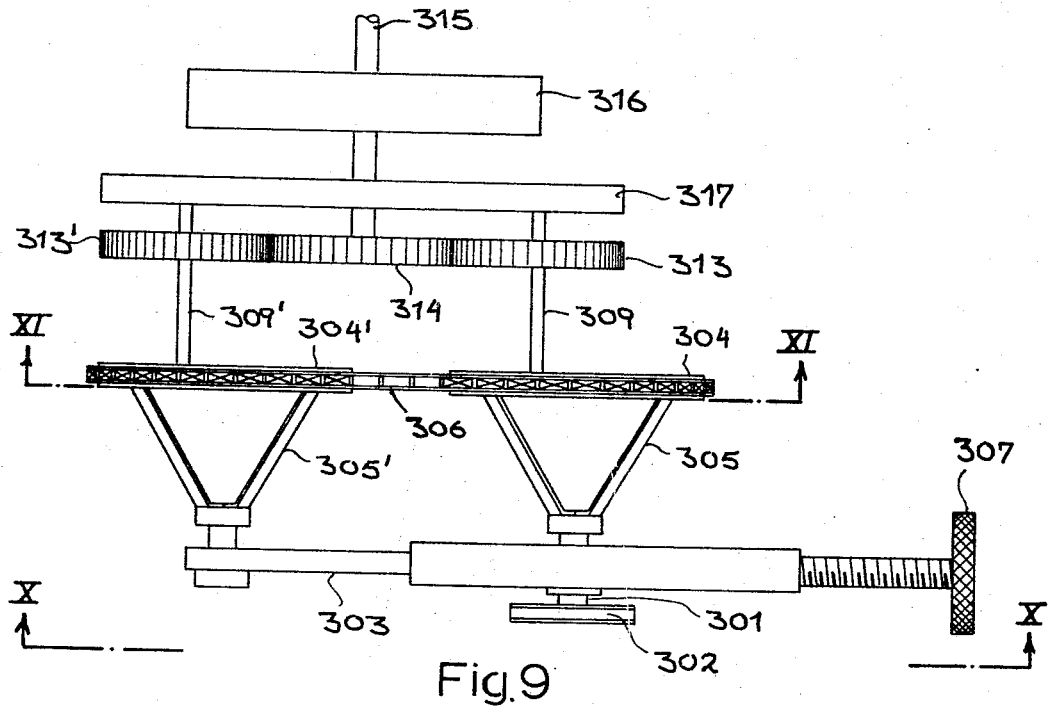
FIG. 9 is a plan view, similar to FIG. 1, of yet a further embodiment.
Figure 10:
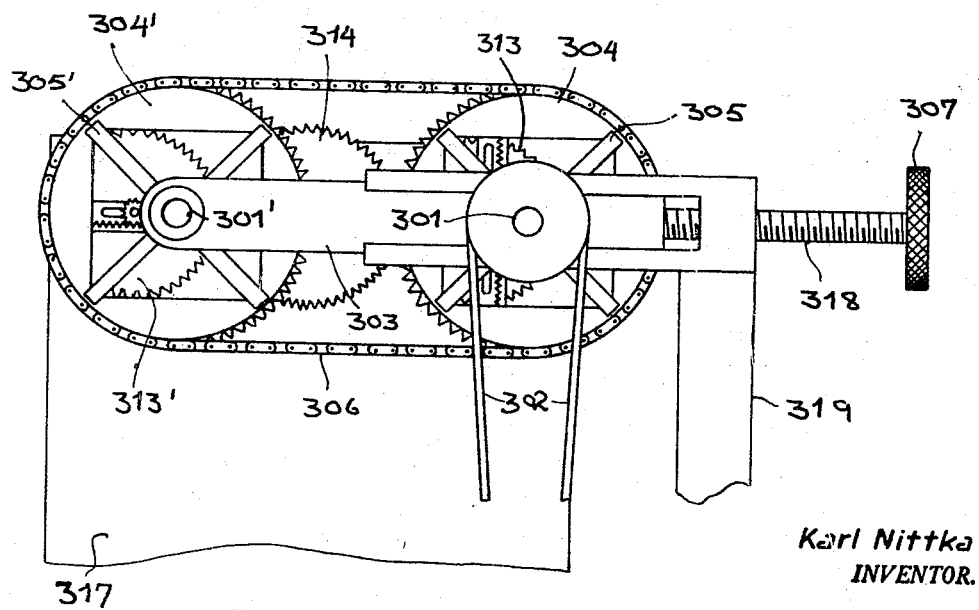

As shown in FIGS. 9–11, it is possible to reverse the arrangement previously described by operatively coupling the input shaft with the disk rather than with a slide. A drive motor, not shown, rotates an input shaft 301 via a belt 302 which permits limited lateral displacement of the shaft along with a bar 303 on which it is journaled. A disk 304, mounted on shaft 301 with the aid of a spider 305, has peripheral sprocket teeth engaged by a chain 306 which drives a similar disk 304' in step therewith. Disk 304' is supported by a spider 305' on an auxiliary shaft 301' also journaled in bar 303. A knob 307 on a leadscrew 318, mounted in axially fixed position in a bifurcate holder 319, enables horizontal shifting of bar 303 with its shafts 301, 301'; this arrangement for the adjustment of eccentricity is, of course, representative of similar mechanisms adapted to be used for varying the transmission rate in the arrangements of FIGS. 3–8. Disks 304 and 304' are provided with square cutouts 307, 307' accommodating respective slides 308, 308' fulcrumed on shafts 309, 309'. These shafts traverse slots 310, 310' in the slides and carry pinions 311, 311' meshing with single racks 312, 312' on the respective slide bodies. Shafts 309, 309' also carry overrunning clutches 313, 313' engaging, in the aforedescribed manner, a common gear 314 on an output shaft 315 provided with a flywheel 316. Shafts 309, 309' and 315 are journaled in a wall 317.

The reciprocation of slide 308 or 308' relative to its fulcrum is communicated to the respective shafts 309, 309' via racks 312, 312' and pinions 311, 311', these two pinions and shafts thus oscillating at a relatively high rate, and 90° out of phase, in substantially the manner described with reference to gears 121, 122 of FIGS. 3–6. Shaft 315 is, therefore, driven at a rate corresponding to the maximum speed of these oscillations additively or subtractively superimposed upon the basic speed of input shaft 301, as heretofore explained.

It will be understood that compatible features of different embodiments may be combined or substituted and that the arrangements specifically disclosed may be otherwise modified, in ways readily apparent to persons skilled in the art, without departing from the spirit and scope of my invention as defined in the appended claims.

I claim:

1. A transmission system for transmitting torque from a drive shaft to a driven shaft, comprising a rotatable disk member provided with a pair of parallel tracks bounding a rectangular area substantially centered thereon, a slide member reciprocable along said tracks and provided with pivot means enabling its rotation about a stationary fulcrum offset from the center of said disk member, said slide member having a slot accommodating said pivot means and extending at right angles to said tracks, first coupling means between said drive shaft and one of said members for rotating same, thereby causing reciprocation of said slide member along said tracks to an extent determined by the spacing of said fulcrum from said center, adjustment means for varying said spacing, and second coupling means between said slide member and said driven shaft for converting said reciprocation into rotation of said driven shaft.

2. A system as defined in claim 1 wherein said adjustment means comprises a displaceable support for said disk member, said pivot means being a portion of said drive shaft, said first coupling means comprising key means on said portion matingly engaging in said slot.

3. A transmission system for transmitting torque from a drive shaft to a driven shaft, comprising a rotatable disk member provided with a pair of parallel tracks bounding a rectangular area substantially centered thereon, a slide member reciprocable along said tracks and provided with pivot means enabling its rotation about a stationary fulcrum offset from the center of said disk member, said slide member having a slot accommodating said pivot means and extending at right angles to said tracks, first coupling means between said drive shaft and one of said members for rotating same, thereby causing reciprocation of said slide member along said tracks to an extent determined by the spacing of said fulcrum from said center, adjustment means for varying said spacing, and unidirectional second coupling means between said slide member and said driven shaft for converting at least alternate strokes of said reciprocation into unidirectional rotation of said driven shaft.

4. A system as defined in claim 3 wherein said second coupling means comprises a holder rotatable about an axis in line with said fulcrum, a pair of gears mounted on said holder on opposite sides of said axis, a dual rack on said slide member engaged by said gears, and a pair of relatively inverted overrunning clutches respectively coupled with said gears for alternately rendering the latter effective to rotate said driven shaft.

References Cited
UNITED STATES PATENTS

| | | | |
|---|---|---|---|
| 335,147 | 2/1886 | Powell | 74—117 |
| 1,190,764 | 7/1916 | Hazen | 74—121 |
| 1,301,982 | 4/1919 | Smith | 74—117 |
| 3,090,250 | 5/1963 | Budlong | 74—571 |

FRED C. MATTERN, Jr., *Primary Examiner.*

W. S. RATLIFF, *Assistant Examiner.*